US012413642B2

United States Patent
Mesde et al.

(10) Patent No.: US 12,413,642 B2
(45) Date of Patent: Sep. 9, 2025

(54) PLUG-IN ORCHESTRATOR FOR VEHICLE DATA STREAM SUBSCRIPTION SYSTEM

(71) Applicant: Amazon Technologies, Inc., Seattle, WA (US)

(72) Inventors: Roland Mesde, Cupertino, CA (US); Alex Bessonov, San Jose, CA (US); Paolo Gruenberg Hilario, West Linn, OR (US); Roie Hodara, Berlin (DE); Madhur Pyasi, Berlin (DE); Sebastian Hochmuth, Adlishil (CH)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/809,868

(22) Filed: Jun. 29, 2022

(65) Prior Publication Data

US 2024/0098143 A1 Mar. 21, 2024

(51) Int. Cl.
*H04L 67/12* (2022.01)
*H04L 41/0806* (2022.01)

(52) U.S. Cl.
CPC .......... *H04L 67/12* (2013.01); *H04L 41/0806* (2013.01)

(58) Field of Classification Search
CPC ... H04L 63/123; H04L 2209/84; H04L 43/04; H04L 67/12; H04L 41/0895; H04L 41/0806; H04L 41/149; H04L 67/1396; G06F 16/9035; G06F 16/908; G06Q 30/0252; G06Q 30/0603; G06N 5/022
See application file for complete search history.

(56) References Cited

U.S. PATENT DOCUMENTS

| | | | |
|---|---|---|---|
| 7,177,859 B2 * | 2/2007 | Pather | G06F 16/9535 |
| 10,160,456 B2 | 12/2018 | Jun | |
| 11,832,416 B1 * | 11/2023 | Albright | G06T 19/003 |
| 11,924,210 B2 * | 3/2024 | Zhang | G06F 21/6218 |
| 2008/0164997 A1 * | 7/2008 | Aritsuka | G01S 5/0009 |
| | | | 340/539.13 |

(Continued)

OTHER PUBLICATIONS

U.S. Appl. No. 17/710,585, filed Mar. 31, 2022, Roland Mesde, et al.

(Continued)

*Primary Examiner* — Tonia L Dollinger
*Assistant Examiner* — Linh T. Nguyen
(74) *Attorney, Agent, or Firm* — Alexander A. Knapp; Kowert, Hood, Munyon, Rankin & Goetzel, P.C.

(57) ABSTRACT

A vehicle data streaming service may receive requests to register plug-ins to generate synthetic vehicle attribute data streams. A plug-in service of the vehicle data streaming service may configure a given plug-in in an internal containerized environment in a fully automated manner and/or configure the plug-in in an external compute service environment. The vehicle data streaming service may configure the plug-ins to receive input streams to generate synthetic attribute output streams. The vehicle data streaming service and the plug-in service may allow the synthetic attribute output streams to be associated with synthetic vehicle attributes included, or to be included, in a curated catalog of vehicle attributes. The vehicle data streaming service furthermore allows one or more vehicle data stream destinations to subscribe to the synthetic vehicle attributes included in the catalog.

20 Claims, 9 Drawing Sheets

(56) References Cited

U.S. PATENT DOCUMENTS

| | | | |
|---|---|---|---|
| 2008/0178143 A1* | 7/2008 | Dougan | G06F 8/20 |
| | | | 717/100 |
| 2014/0189814 A1* | 7/2014 | Marten | G08G 1/205 |
| | | | 726/4 |
| 2014/0280177 A1 | 9/2014 | Ish, II | |
| 2016/0050269 A1 | 2/2016 | Botticelli | |
| 2016/0241676 A1* | 8/2016 | Armstrong | G06F 16/24568 |
| 2017/0011129 A1* | 1/2017 | Matsumoto | G06F 40/194 |
| 2017/0026858 A1* | 1/2017 | Mckee | H04W 24/04 |
| 2017/0138625 A1* | 5/2017 | Shiratori | F24F 11/89 |
| 2018/0183873 A1* | 6/2018 | Wang | H04L 67/12 |
| 2018/0268115 A1* | 9/2018 | Zhang | G06F 9/455 |
| 2019/0036830 A1* | 1/2019 | Yamato | H04M 11/00 |
| 2019/0280944 A1* | 9/2019 | Bellini | G06F 16/2379 |
| 2019/0349447 A1* | 11/2019 | Adams | G06F 9/5027 |
| 2020/0007663 A1* | 1/2020 | Abilay | H04W 4/48 |
| 2020/0036774 A1* | 1/2020 | Tada | G06F 9/541 |
| 2020/0151611 A1* | 5/2020 | McGavran | G09B 29/102 |
| 2020/0312128 A1* | 10/2020 | Higuchi | G08G 1/096791 |
| 2020/0336541 A1* | 10/2020 | Naderi Alizadeh | H04L 67/01 |
| 2021/0035124 A1* | 2/2021 | Morton | G06F 16/00 |
| 2021/0075858 A1* | 3/2021 | Naito | H04L 67/12 |
| 2022/0232010 A1* | 7/2022 | Zhang | H04L 63/0884 |
| 2022/0383019 A1* | 12/2022 | Tremblay | G06V 40/11 |
| 2023/0008976 A1* | 1/2023 | Xu | H04L 9/3247 |
| 2023/0065491 A1* | 3/2023 | Ren | G06V 40/161 |
| 2023/0205670 A1* | 6/2023 | Cardoso | G06F 11/3692 |
| | | | 717/126 |
| 2023/0325247 A1* | 10/2023 | Hassani | G06F 9/4881 |
| | | | 718/103 |
| 2023/0377383 A1* | 11/2023 | Makita | H04L 67/565 |
| 2024/0096139 A1 | 3/2024 | Mesde et al. | |

OTHER PUBLICATIONS

U.S. Appl. No. 17/710,634, filed Mar. 31, 2022, Roland Mesde, et al.

U.S. Appl. No. 17/710,644, filed Mar. 31, 2022, Roland Mesde, et al.

U.S. Appl. No. 17/710,551, filed Mar. 31, 2022, Roland Mesde, et al.

U.S. Appl. No. 17/806,434, filed Jun. 10, 2022, Roland Mesde, et al.
U.S. Appl. No. 17/809,878, filed Jun. 29, 2022, Roland Mesde, et al.
U.S. Appl. No. 17/810,301, filed Jun. 30, 2022, Roland Mesde, et al.
U.S. Appl. No. 19/173,992, filed Apr. 9, 2025, Roland Mesde, et al.

* cited by examiner

PLUG-IN ORCHESTRATOR FOR VEHICLE DATA STREAM SUBSCRIPTION SYSTEM

BACKGROUND

Modern vehicles, such as cars, trucks, motorcycles, etc. are often equipped with electronic sensors and computer systems that are programmed to take inputs from such electronic sensors to control various actions for the vehicle (or systems implemented in the vehicle). These electronic sensors and computer systems generate various types and quantities of data. Data generated from these sensors of the vehicle may be stored or transmitted for use by various entities, such as downstream applications or data analytics.

Figure 1:
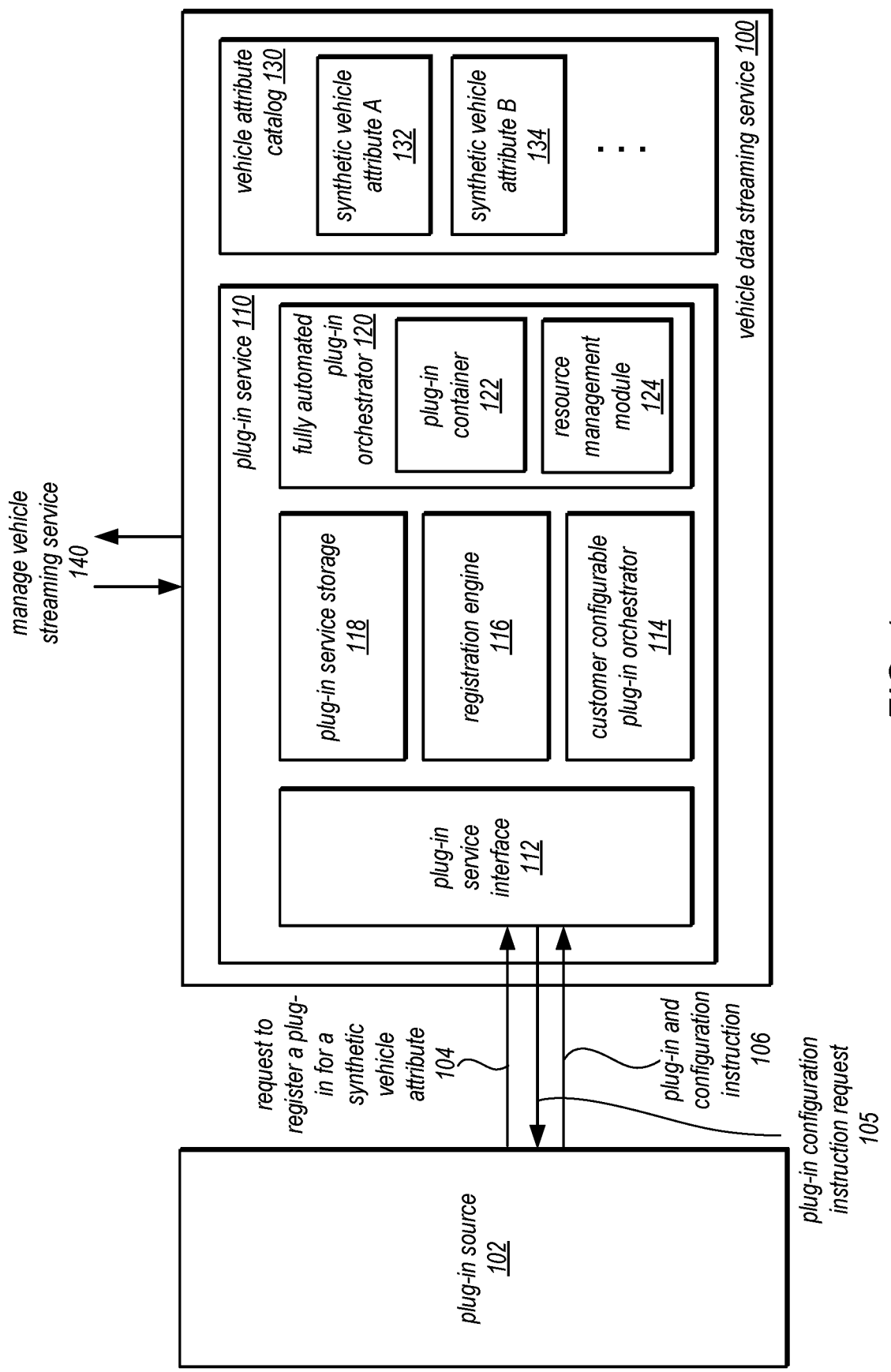
FIG. 1 illustrates a vehicle data streaming service includes a plug-in service, wherein the plug-in service is configured to receive a request to register a plug-in. The plug-in service of the vehicle data streaming service, in response to such a request, configures a plug-in in the data streaming service and configures the plug-in to receive input streams to generate a synthetic attribute output stream. The vehicle data streaming service and the plug-in service allow the synthetic attribute output stream to be associated with a synthetic vehicle attribute included, or to be included, in a curated catalog of vehicle attributes managed by the data-streaming service. The vehicle data streaming service also allows a vehicle data stream destination to subscribe to the synthetic vehicle attribute included in the catalog. Additionally, the vehicle data streaming service manages the plug-in service and the vehicle attribute catalog, according to some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein include techniques for implementing a vehicle data streaming service for receiving and registering a plug-in, configuring the plug-in, and generating a synthetic attribute output stream. Vehicles may be equipped with electronic sensors which may generate data to be utilized for various applications—from increasing fuel efficiency of a vehicle to enhancing greater degrees of automation using artificial intelligence (AI). Vehicles may use data received from such sensors to improve vehicle performance. In some embodiments, a plug-in may be used to enrich/process such sensor data to generate other useful synthetic data. The vehicle data streaming service may configure a plug-in to receive a stream of vehicle data and provide an output stream for a synthetic vehicle attribute. However, in order to utilize such a plug-in, the vehicle data streaming service may require the vehicle streaming service to manage various components. For example, for a given synthetic vehicle attribute, there may be multiple data stream providers, data processing plug-ins, and data stream receivers that may need to be coordinated. The management of various plug-ins, input sources for plug-ins, recipients of output data from plug-ins (e.g., synthetic vehicle attributes), and presentment of various synthetic vehicle attributes generated by plug-ins to potential subscribers poses a non-trivial challenge. For example, for a given set of data streams generated from a vehicle, there may be a multitude of specialized data stream providers respectively managing portions of the vehicle sensor data. Furthermore, there may be a multitude of data stream destinations respectively interested in receiving all or only certain portions of the vehicle data processed by the plug-in. In some embodiments, the plug-in may be designed to only receive a select portion of vehicle data generated by the vehicle and included in the data streaming service. For example, only a select subset of available vehicle streams may be pertinent to analysis to be performed using the plug-in. Sending all available data from a vehicle (or vehicle data streaming service) may not only create unnecessary network load involved in the transfer of the large amount of data but may also create inefficiencies in requiring the destination to filter out irrelevant vehicle data.

In some embodiments, the vehicle data streaming service may associate vehicle data stream sources to a plug-in that generates synthetic vehicle attributes and allow vehicle data stream consumers to receive the data streams corresponding to the synthetic vehicle attributes that comprise data generated by the plug-in, e.g. plug-in processed data. In some embodiments, the vehicle data streaming service may manage mappings and connections of synthetic vehicle attributes to the plug-ins and to the various subscribers of the synthetic vehicle attributes. Moreover, in some embodiments, the vehicle data streaming service may facilitate the movement of vehicle data from various plug-ins to stream destinations by providing a curated catalog of vehicle attributes, including the synthetic vehicle attributes. The curated catalog of vehicle attributes/synthetic attributes may be used by vehicle plug-in sources to register and associate their plug-in to synthetic vehicle attributes of the catalog. The vehicle data streaming service may allow vehicle data stream destinations (or customers associated with the data stream destinations) to subscribe to the synthetic vehicle attributes in the vehicle catalog. For example, the vehicle data streaming service may obtain the streamed vehicle data from the vehicle data stream source, route at least a portion of the vehicle data to the plug-in, and send streamed data outputted from the plug-into the vehicle data stream destinations. The vehicle data streaming service may further provide governance of the registration/subscription process for the plug-in (and/or other data streams) and enforce data schema requirements and access requirements. Additionally, the vehicle data streaming service may manage the vehicle attribute catalog and aid the discovery of pertinent vehicle attributes, including synthetic vehicle attributes. In some embodiments, the vehicle streaming service may manage the configuration of one or more plug-ins that are registered. The one or more plug-ins may be instantiated inside the vehicle data streaming service in a fully automated manner and/or outside of the vehicle data streaming service in a customer configurable compute service environment as further discussed in FIGS. 3 and 4.

FIG. 1 illustrates a vehicle data streaming service that receives a request to register a plug-in. The plug-in service of the vehicle data streaming service configures the plug-in and receive input streams to generate a synthetic attribute output stream. The vehicle data streaming service and the plug-in service allows the synthetic attribute output stream to be associated with a synthetic vehicle attribute included, or to be included, in a curated catalog of vehicle attributes. The vehicle data streaming service also allows a vehicle data stream destination to subscribe to the synthetic vehicle attribute included in the catalog. Additionally, the vehicle data streaming service manages the plug-in service and the vehicle attribute catalog, according to some embodiments.

In FIG. 1, a vehicle data streaming service 100 includes a vehicle attribute catalog 130 and a plug-in service 110. The plug-in service may receive a request to register a plug-in for a synthetic vehicle attribute 104. A plug-in service interface 112 of the plug-in service 110 may receive the request to register a plug-in for a synthetic vehicle attribute 104 and send a plug-in configuration instruction request 105 in response. A plug-in may be any software, script, add-on, or extension that processes data for the vehicle data streaming service 100. In some embodiments, the plug-in may take in as inputs one more data streams, perform one or more data processing operations, and send as outputs one or more processed data streams associated with synthetic vehicle attributes. The plug-in configuration instruction request 105 may be a request for one or more configurations that are required to instantiate and operate the plug-in via a fully automated plug-in orchestrator 120 and/or a customer configurable plug-in orchestrator 114. For example, the plug-in configuration may request the destination address of a container or a compute service to run the plug-in. The fully automated plug-in orchestrator 120 will further be described in FIG. 4, and the customer configurable plug-in orchestrator 114 will further be described in FIG. 3.

Once the plug-in service 110 receives the plug-in configuration instruction request 105 wherein the request is in accordance with configuration and instructions requirements for plug-ins, the plug-in source may send the plug-in and configuration instruction 106 to the plug-in service interface 112. The plug-in configuration instruction may include instructions to instantiate the plug-in in a customer configured environment using the customer configurable plug-in orchestrator 114 and/or automatically instantiate the plug-in on behalf of the customer using the fully automated plug-in orchestrator 120. In some embodiments, the instructions may include a number of resources to be configured for the plug-in environment. Once the plug-in service interface 112 receives the plug-in, the plug-in may be stored in a plug-in service storage 118. The plug-in service storage 118 may be implemented as a centralized datastore so that other data storage services may access data stored in the centralized datastore for processing and/or storing within other data storage services, in some embodiments. Such a data storage service 240 may be implemented as an object-based data store and may provide storage and access to various kinds of objects. The data storage service 240 may also be implemented as a file-based data store and provide storage and access to files for putting, updating, and getting various storage objects of various types, sizes pertinent to the plug-in.

In some embodiments, the fully automated plug-in orchestrator 120 may include a plug-in container 122 and a resource management module 124. The plug-in container 122 may be a software execution environment that implements code and all the code's dependencies allowing an application to run in a way that is agnostic from one computing environment to another. The plug-in container 122 may include and/or be configured with various software components needed to run a plug-in, including: application code, application runtime, system tools, system libraries and settings. The resource management module 124 may monitor the resource impact of the plug-in, for example on the vehicle data streaming service 100 or computing resources allocated for use by the vehicle data streaming service 100. For example, the resource management module 124 may monitor an amount of memory and/or processing activity of the vehicle data streaming service 100 that is used by the plug-in executing in the plug-in container 122 and may initiate workflows to limit an amount of computing resources used by the plug-in.

The vehicle data streaming service 100 may furthermore enable management of the vehicle attribute catalog 130 and the changing of one or more governance policies of the vehicle data streaming service 100. In some embodiments, the vehicle data streaming service 100 may allow one or more users to create, update, or delete vehicle attributes/synthetic vehicle attributes as well as one or more pieces of associated metadata for the vehicle attributes/synthetic vehicle attributes. For example, a name assigned to the synthetic vehicle attribute A 132 and a synthetic vehicle attribute B 134 may be updated using the vehicle data streaming service 100. The vehicle data streaming service 100 may allow one or more users to manage aspects of the vehicle streaming service 140, such as what vehicle attributes and/or synthetic vehicle attributes are included in a curated catalog, as well as what names are assigned to the respective vehicle attribute and/or synthetic vehicle attributes. In some embodiments, users may further be able to define access requirements for potential subscribers that would like to subscribe to various data streams. In some embodiments, the one or more users may be able to configure the vehicle data streaming service 100 including a plug-in service 110. The management of vehicle streaming service will be further described in FIG. 5.

Although FIG. 1 depicts only one plug-in source 102, any number of plug-in sources may be sent to the vehicle data streaming service 100. The vehicle data streaming service 100 may, in various embodiments, be an apparatus or system for managing the distribution, storage, retrieval, and/or processing of large-scale vehicle data streams. The vehicle data streaming service 100 may be designed to handle hundreds or even thousands of concurrent data sources and destinations. The term "data stream", as used herein, refers to a sequence of vehicle data records that may be generated by one or more data sources (e.g., vehicle sensors, vehicle synthetic sensors, etc.) or producers (e.g., a vehicle, a vehicle service center, etc.) and accessed by one or more vehicle data consumers at one or more destinations.

Please note that the previous description of a vehicle data streaming service 100 is a logical illustration and thus is not to be construed as being limited to a specific implementation of network addresses, system interfaces, or various other features. In some embodiments, various other registration flow steps may be used to associate a vehicle data stream from the data stream source 200 (as described below in regard to FIG. 2) to a vehicle attribute of the vehicle attribute catalog 130. Different combinations or implementations may be implemented in various embodiments.

This specification continues with various examples of a vehicle data streaming service including different components/modules, or arrangements of components/module that may be employed as part of implementing the vehicle data streaming service and the plug-in service included in the vehicle data streaming service. A number of different methods and techniques to implement various methods of implementation of a plug-in and management of the vehicle data streaming service (including the synthetic vehicle attribute catalog) are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
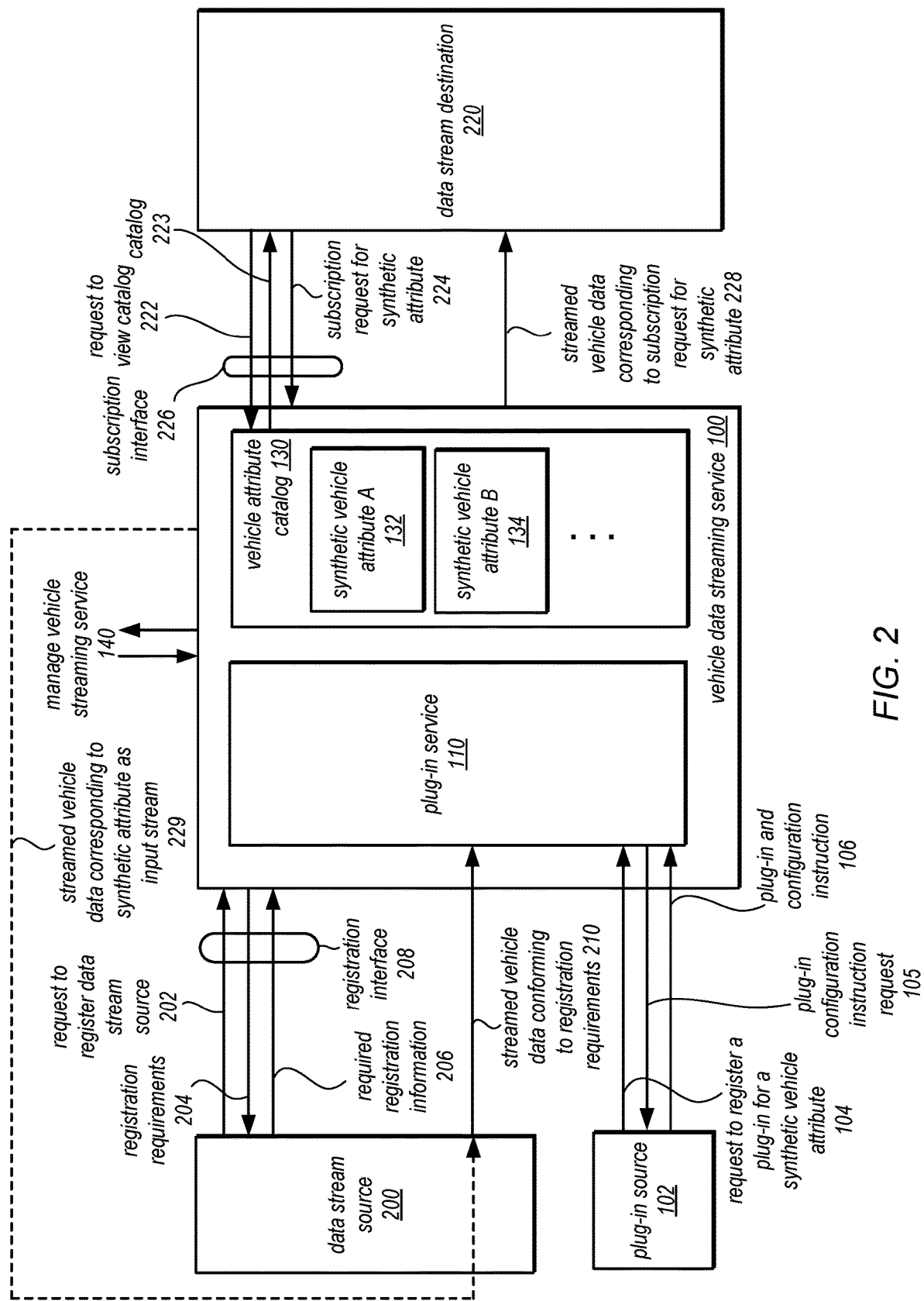
FIG. 2 illustrates a more detailed view of the vehicle data streaming service that includes the plug-in service and illustrates a registration flow of a data stream source for a synthetic vehicle attribute to be provided by a plug-in. The vehicle data streaming service receives streamed vehicle data to be processed by the plug-in, and the plug-in processes the received data to generate an output stream for a synthetic vehicle attribute. The vehicle data streaming service also manages a subscription flow for the synthetic vehicle attribute, in addition to managing a vehicle attribute catalog comprising synthetic vehicle attributes (along with non-synthetic vehicle attributes. Additionally, the plug-in service of the vehicle data streaming service manages the registration of the plug-in, while the data streaming service manages subscription of a generated synthetic vehicle attribute to a subscribing destination, according to some embodiments.

FIG. 2 illustrates a more detailed view of the vehicle data streaming service and illustrates a registration flow of a data stream source for a synthetic vehicle attribute. The vehicle data streaming service receives streamed vehicle data to be processed by a plug-in. The plug-in processes the received streamed vehicle data and generates an output stream for a synthetic vehicle attribute. The vehicle data streaming service also handles a subscription flow for the data stream corresponding to the synthetic vehicle attribute, manages a vehicle attribute catalog containing synthetic vehicle attributes, and manages the registration of the plug-in and subscription of the data stream corresponding to the synthetic vehicle attribute by a destination, according to some embodiments.

As an example, in some embodiments, the vehicle data streaming service 100 may receive a request to register data stream source 202 from a data stream source 200. In some embodiments, the request to register the data stream source 202 may further include a request for a vehicle data stream source to be recognized as a vehicle data stream source by the vehicle data streaming service 100. In some embodiments, the request 202 may additionally provide required information to establish a streaming relationship wherein the vehicle data streaming service 100 may be an endpoint of a data pipeline from the vehicle data stream source (wherein the vehicle data streaming service further provides streamed vehicle data provided to the endpoint to vehicle data consumers). In some embodiments, the request to register data stream source 202 may include one or more access credentials required to be recognized as a legitimate data stream source by the vehicle data streaming service 100. The term "access credentials" or "credentials" are used herein to mean various credentials that verify the identity of the requesting entity and/or authorization granted to the requesting entity that is required to perform the requested action. For example, in some embodiments, the vehicle data streaming service may reject a request made by a user having a verified identity (e.g., known username and password) because the entity associated with the verified identity lacks authorization to access data targeted by the request, e.g., the entity has improper "access credentials" based on a lack of authorization to perform the request.

In some embodiments, the vehicle data streaming service 100 may send registration requirements to the data stream source to complete the registration. The registration requirements may include a source infrastructure identity, a required configuration to conform messages from the data source to a schema, a vehicle attribute to associate to the source, and/or a mapping required to configure the vehicle data schema. The data stream source may further submit the required registration information 110 according to the registration requirements 204 to complete the registration of the data stream source and to effectuate association of the data stream source with one or more vehicle attributes of the vehicle attribute catalog 130. The various registration interactions may occur through a registration interface 208 of the vehicle data streaming service 100. In some embodiments, the registration request may require approval by the vehicle data streaming service 100. In some embodiments, the registration request may require approval obtained as part of interactions involving the management of the vehicle streaming service 140. Once the registration request is approved, a vehicle data stream conforming to the registration requirements may be streamed to the vehicle data streaming service 210.

Once the vehicle data streaming service 100 has received the streamed vehicle data, the plug-in service 110 may apply one or more operations to the streamed vehicle data conforming to the registration requirements in order to generate a new output for synthetic attributes. (Note that while this example includes both the registration of a new data stream and the registration of a plug-in, in some embodiments, a plug-in may be configured to use already existing vehicle attributes from already registered data streams).

In some embodiments, the vehicle attribute catalog 130 may generate data for multiple synthetic vehicle attributes. For example, the plug-in service 110 may obtain stream vehicle data 210 from the data stream source 200 to generate synthetic vehicle attribute A 132 and synthetic vehicle attribute B 134. In some embodiments, one or more data stream destinations 146 may view the vehicle attribute catalog 130 to discover synthetic vehicle attributes available in the vehicle attribute catalog that correspond to data of interest to be received at the data stream destinations. The data stream destination 140 may send a request to view catalog 222 and, based on the received catalog 223, select one or more vehicle attributes/synthetic vehicle attributes to receive. The subscription request for synthetic attribute 224 and a request to view the catalog 222 may be performed through the subscription interface 226 of the vehicle data streaming service 100.

In some embodiments, a data stream destination 220 and an entity issuing a request to subscribe to a data stream at the data stream destination may be the same entity or different entities. Upon a successful subscription request for the synthetic attribute 224, the vehicle data streaming service 100 may create a mapping between the streamed vehicle data conforming to the data stream destination 220. The vehicle data streaming service 100 may send a streamed vehicle data stream corresponding to the subscription request for the synthetic attribute 224 to the data stream destination 220. In some embodiments, the streamed vehicle data corresponding to the subscription request for the synthetic attribute 224 may be modified to conform to the schema of the data stream destination 220. Furthermore, the data stream destination 220 may be any number of downstream services/applications. In some embodiments, the data stream destination 220 may be a vehicle shadow that allows interaction between a virtual representation of a connected vehicle to a user. In some embodiments, the data stream destination 220 may be a data analytics service, a data lake that provides a repository of vehicle data, and/or other data storage services. In some embodiments, another plug-in may act as a data stream destination for a data stream corresponding to a synthetic vehicle attribute generated by a first plug-in. In such embodiments, the output of the first plug-in may act as a data stream source for the other plug in. A plug-in may receive the streamed vehicle data corresponding to the synthetic attribute as an input stream 229. For example, one or more plug-ins may be configured during their registration stage (or at different times) to subscribe to a synthetic attribute. Based on the received synthetic attribute data stream, the plug-in may generate another synthetic vehicle attribute. In some embodiments, the required registration information 206 may also contain information similar to the subscription request for the synthetic vehicle attribute 224. In some embodiments, the plug-in that was previously registered may be modified to subscribe to a different synthetic vehicle attribute and initiate subscription flow as discussed above.

Although FIG. 2 depicts only one data stream source 200 and one data stream destination 220, any number of data sources may send vehicle information to the vehicle data streaming service 100 and any number of data stream destinations may receive vehicle information. Furthermore, as discussed above, in some embodiments, the synthetic vehicle attribute data stream may be streamed to one or more additional plug-ins. Please note that the previous description of a vehicle data streaming service 100 is a logical illustration and thus is not to be construed as being limited to a specific implementation of network addresses, system interfaces, or various other features. In some embodiments, various other registration flow steps may be used to receive a vehicle data stream from the data stream source 200 and process the data stream using a plug-in for a synthetic vehicle attribute of the vehicle attribute catalog 130. Different combinations or implementations may be implemented in various embodiments.

Figure 3:
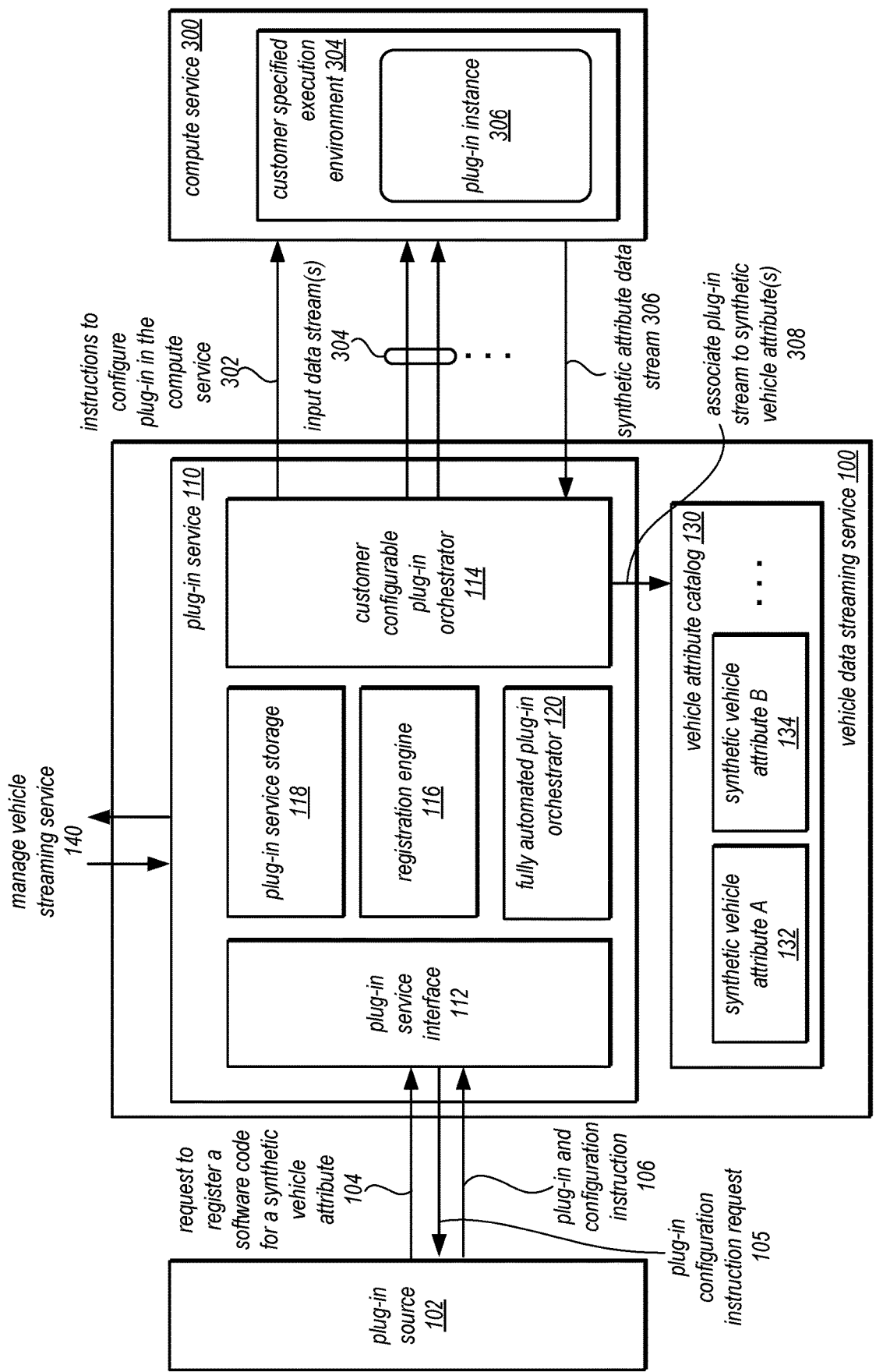
FIG. 3 illustrates a more detailed view of the vehicle data streaming service that includes a plug-in service configured to orchestrate configuration of a plug-in using a customer configurable plug-in orchestration environment. For example, the customer configurable plug-in orchestration environment may be configured using a customer specified execution environment in a compute service outside the vehicle data streaming service. The plug-in service of the vehicle data streaming service may configure the plug-in and/or configure input data streams for the plug-in, such that the plug-in is located in the customer specified execution environment and the input data streams are routed to the customer specified execution environment. Also, the plug-in service of the vehicle data streaming service may configure the plug-in and/or configure output data streams from the plug-in, such that the vehicle data streaming service receives a synthetic attribute data stream from the plug-in executing in the customer configurable plug-in orchestration environment, according to some embodiments.

FIG. 3 illustrates a more detailed view of the vehicle data streaming service that configures a plug-in using a customer configurable plug-in orchestrator. The customer configurable plug-in orchestrator configures a customer specified execution environment in a compute service outside the vehicle data streaming service. A plug-in service of the vehicle data streaming service configures the plug-in and/or configures input data streams for the customer specified execution environment and receives a synthetic attribute data stream, according to some embodiments.

In some embodiments, the customer configurable plug-in orchestrator 114 may send instructions 302 to configure a plug-in in a compute service. The compute service 300 may be configurable by the customer and, in some embodiments, implemented by the provider network of the vehicle data streaming service 100. The degree in which the customer may configure the compute service 300 may be partial or complete. For example, the compute service 302 may be a service provided for the customer through a same service provider as a service provider providing the data streaming service, or may be a third-party that restricts the customer from configuring the compute service in a certain manner. In some embodiments, the compute service 300 may be implemented by another provider network separate from the provider network of the vehicle data streaming service 100. The compute service 300 may offer instances, containers, and/or functions according to various configurations for implementing the plug-in, including the generation of a plug-in instance 306. In some embodiments, the compute service 300 may comprise one or more servers that implement one or more computing instances with respective specified computational capacities. For example, the compute service 300 (and computing instances of the compute service 300) may be specified by instructions indicating the type and number of CPUs, the main memory size and a specified software stack that are to be used to implement the plug-in. The compute service 300 may provide a virtual operation system or other customers specified execution environment 304 for executing or implementing the plug-in received by the vehicle data streaming service 100. The plug-in may be implemented as one or more operations that are performed in response to the vehicle data streaming service 100 sending instructions to configure the plug-in in the compute service 302. In some embodiments, the instructions to configure plug-in may be instructions to generate the customer specified execution environment 304. The compute service 300 may receive the instructions to configure the plug-in from the customer configurable plug-in orchestrator 114 and generate the customer specified execution environment 304 according to the instructions. In some embodiments, the instructions to configure the plug-in may establish input data streams 304 and establish synthetic attribute data stream 306, wherein the input data streams are provided to the compute service 300 and an output stream corresponding to the synthetic vehicle attribute is provided from the compute service 300. In some embodiments, the customer specified execution environment 304 may be automatically scaled to provide the appropriate number of computing resources to perform the operations in accordance with the plug-in. A number of different types of computing devices may be used singly or in combination to implement the customer specified execution environment 304, including general purpose or special purpose computer servers, storage devices, network devices and the like.

Various compute instances, containers, and/or functions may be used to operate or implement a variety of different plug-ins. The compute service 300 may support various interpreted or compiled programming languages such as Ruby, Perl, Python, C, C++ and the like, or high-performance computing services. In some embodiments, customer specified execution environment 304 may be configured according to the configuration instruction 106. For example, the size of compute instances, containers, and/or functions, such as a particular number of virtual CPU cores, memory, cache, storage, as well as any other performance characteristic may be determined by the configuration instruction. Configurations of the compute instances, containers, and/or functions of the customer specified execution environment 304 may furthermore be determined based on the instructions to configure plug-in in the compute service 302. In various embodiments, the plug-in may be implemented by a particular node or may be distributed across several nodes. Upon establishment of the synthetic attribute data stream 306, the customer configurable plug-in orchestrator 114 may associate the plug-in stream to one or more synthetic vehicle attributes 308.

Figure 4:
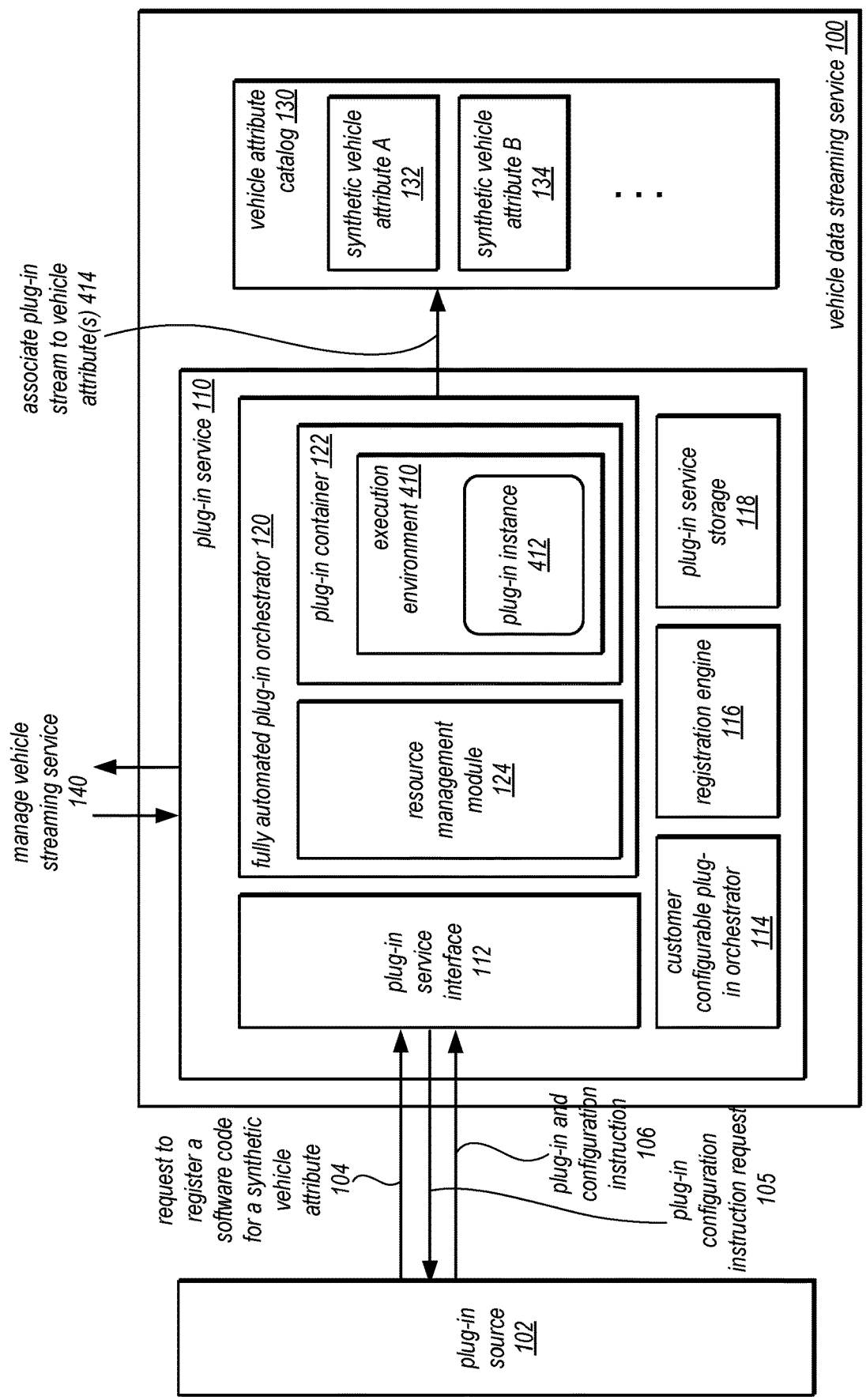
FIG. 4 illustrates a more detailed view of the vehicle data streaming service having a fully automated plug-in orchestrator able to configure an execution environment within the vehicle data streaming service. The fully automated plug-in orchestrator of the vehicle data streaming service may configure the plug-in in a plug-in container and associate a plug-in data stream generated from the plug-in to a synthetic attribute, according to some embodiments.

FIG. 4 illustrates a more detailed view of the vehicle data streaming service having a fully automated plug-in orchestrator able to configure an execution environment within the vehicle data streaming service. The fully automated plug-in orchestrator of the vehicle data streaming service may configure the plug-in in a plug-in container and associate a plug-in data stream to a synthetic attribute, according to some embodiments.

In some embodiments, the fully automated plug-in orchestrator 120 may configure a plug-in container 122 to generate an execution environment 410 with a plug-in instance for 412. Similar to the compute service 300 described in FIG. 3, the plug-in container 122 may be established using one or more computing instances with a specified computational capacity (which may be specified by indicating the type and number of CPUs, the main memory size, and so on). The plug-in container 122 may provide a virtual operation system or other execution environment 410 determined by the vehicle data streaming service 100. In some embodiments, the execution environment 410 provides a predetermined sandbox environment from which the received plug-in may be configured. The plug-in service 110 may be automatically configured and managed by the plug-in service 110. In some embodiments, the degree in which the customer may configure the plug-in container 122 may be partial or complete. For example, the plug-in container 122 may provide several pre-configured options for the plug-in container for the customer to choose but may prevent the customer from configuring the plug-in container 112 directly. The plug-in may be implemented as one or more operations that are performed by the vehicle data streaming service 100 on behalf of a customer. In some embodiments, the fully automated plug-in orchestrator 120 may receive instructions (from the plug-in service 110 and/or a customer) to configure the received plug-in. The fully automated plug-in orchestrator 120 may be used to generate the customer specified execution environment 410 and the plug-in instance 412 in the plug-in container 122. As discussed in FIG. 1, in some embodiments, the fully automated plug-in orchestrator 120 may include a resource management module 124. The resource management module 124 may monitor the resource impact of the plug-in on the vehicle data streaming service 100 (or computing instances allocated to the vehicle data streaming service 100 to provide execution environments). For example, the resource management module 124 may monitor an amount of memory and/or processing activity of the vehicle data streaming service 100 that the plug-in utilizes and may initiate workflows to limit the amount of computing resources used by the plug-in. In some embodiments, the resource management module 124 may furthermore be used to automatically scale or limit the resources of the execution environment 410 to an appropriate number of computing resources to perform the operations in accordance with the plug-in. A number of different types of computing devices may be used singly or in combination to implement the execution environment 410 inside the plug-in container 122 (or in another service of a service provider network that provides resources for the execution environment 410), including general purpose or special purpose computer servers, storage devices, network devices and the like.

Similar to FIG. 3, various compute instances, containers, and/or functions may be used to operate or implement a variety of different plug-ins, such as operating systems of various vehicle models or components. The plug-in container 122 may support various interpreted or compiled programming languages such as Ruby, Perl, Python, C, C++ and the like, or high-performance computing services. In some embodiments, the execution environment 410 in the vehicle data streaming service 100 may be configured according to the manage vehicle streaming service 140 operations. In some embodiments, the execution environment 410 may not be configurable by the plug-in source 102 or other customers. As discussed above, in some embodiments, the plug-in source may be able to configure the execution environment 410 in a limited manner (e.g., only being able to set limits on certain resource configurations). In some embodiments, the fully automated plug-in orchestrator may register the output stream of the plug-in instance 412 with one or more synthetic vehicle attributes 414 using the registration engine 116.

Figure 5:
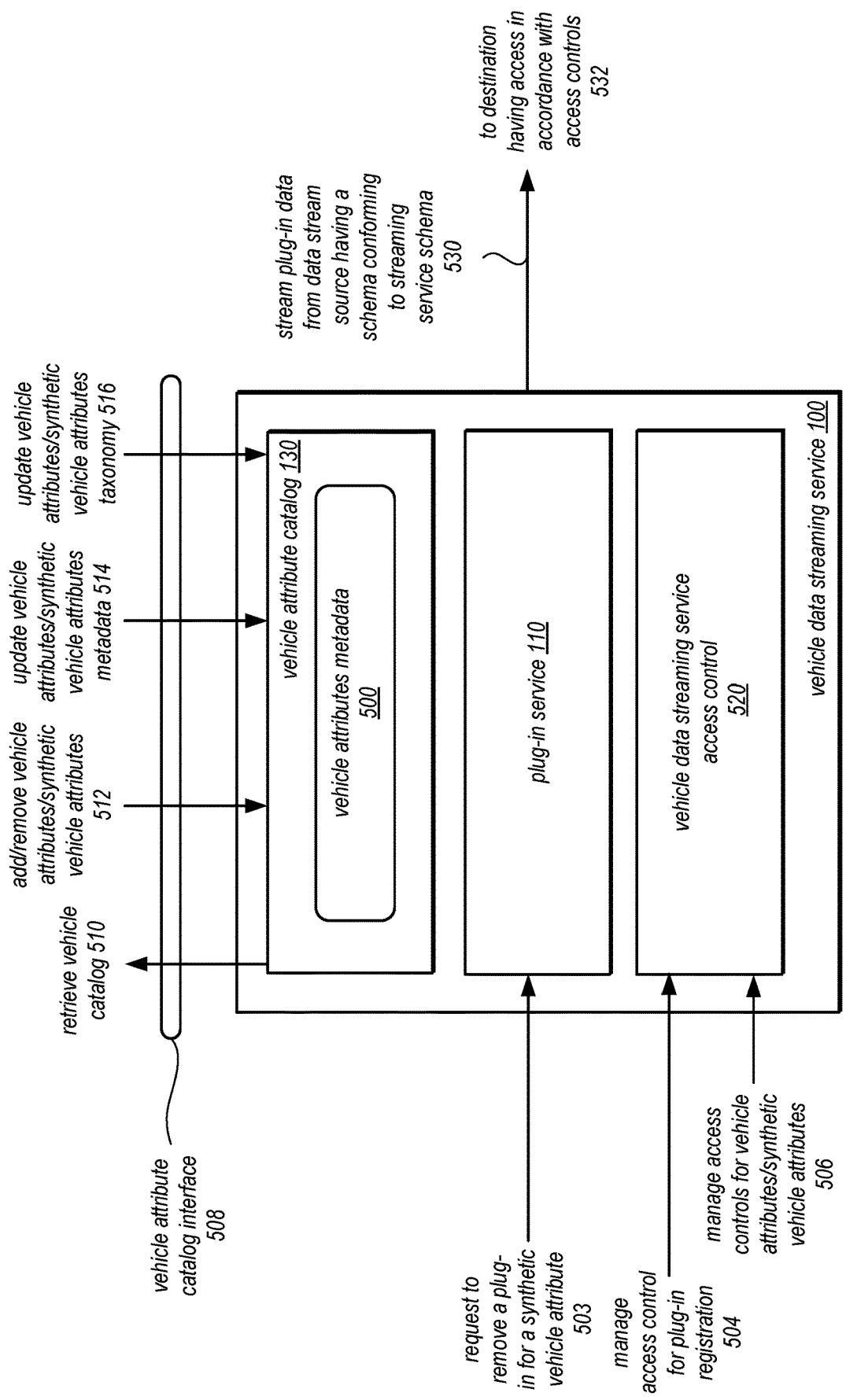
FIG. 5 illustrates a more detailed view of the vehicle data streaming service and management of the vehicle data streaming service, including management of: a vehicle attribute, a synthetic vehicle attribute, and a plug-in service, according to some embodiments.

FIG. 5 illustrates a more detailed view of the vehicle data streaming service and plug-in service showing management functions, including vehicle attribute/synthetic vehicle attribute management and plug-in service management, according to some embodiments.

In some embodiments, a vehicle attribute catalog interface 508 may be used to communicate the vehicle attribute catalog 130 of the vehicle data streaming service 100. As discussed in FIGS. 1 and 2, the vehicle data streaming service 100 may allow one or more users to manage the vehicle data streaming service 100, including the vehicle attribute catalog 130. Metadata associated with vehicle attributes and synthetic vehicle attributes may comprise descriptions of the vehicle attribute/synthetic vehicle attribute, categorization of the vehicle attribute/synthetic vehicle attribute, hierarchical organization of the vehicle attribute/synthetic vehicle attribute, and/or other information to allow data stream destinations and other entities to discover vehicle attribute/synthetic vehicle attribute pertinent to a given application. The vehicle data streaming service 100, via the vehicle attribute catalog interface 508, may allow management of the vehicle attribute catalog 130. For example, one or more authorized users may retrieve vehicle catalog 510, add/remove vehicle attribute/synthetic vehicle attribute 512, update vehicle attribute/synthetic vehicle attribute metadata 514, and update vehicle attribute/synthetic vehicle attribute taxonomy 516. In some embodiments, a change to the vehicle attribute/synthetic vehicle attribute taxonomy may further result in changing a streaming service vehicle schema according to the change in the vehicle attribute taxonomy. In some embodiments, the one or more vehicle attributes/synthetic vehicle attribute of the vehicle catalog may be retrieved through a categorical navigation provided by the vehicle data streaming service 100. In some embodiments, vehicle attributes/synthetic vehicle attributes may be arranged in a hierarchical organization or arranged in unique taxonomy to facilitate the discovery of pertinent vehicle attributes and/or facilitate the navigation of the vehicle attributes. Furthermore, in some embodiments, the vehicle attribute catalog may provide a full text search index to further facilitate the discovery of vehicle attributes/synthetic vehicle attributes.

In some embodiments, the vehicle data streaming service access control 520 may allow one or more users to manage access controls for attributes 522. The vehicle data streaming service access control 520 may allow one or more users to change the type of access credentials required for registration and/or subscription requests. For example, one or more users may manage access controls for vehicle attributes/synthetic vehicle attribute 506 for the requests to require HTTP authentication using username and password sent alongside an API call, require key authentication using unique keys disclosed to authorized users, or using OAuth authorization framework. In some embodiments, the access credentials required in the request may be specified by managing the access controls for attributes/synthetic vehicle attribute 506. For example, the vehicle data streaming service access control 520 may determine a username, username password, role, or other identities that may be authorized to register stream source/destination. Similar access control may be applied to plug-in registration 504. Moreover, in some embodiments, the response that the vehicle data stream source 200 is to take for an unauthorized request with improper access credentials may be managed through the vehicle data streaming service access control 520. For example, the vehicle data stream source 200 may be configured to respond to an unauthorized request with a notice of the denial of permissions. In some embodiments, different access credentials requirements may be determined for certain vehicle attributes/synthetic vehicle attributes. For example, vehicle attributes/synthetic vehicle attributes having greater access requirements may be identified and set to require greater access privileges. Note that in some embodiments, different access privileges may be associated with different users, independent of a manner in which an identify of the users is determined based on access credentials. For example, different users that access the vehicle data streaming service using a same method of providing access credentials, for example using the various access credential mechanisms described above, may be assigned different access privileges.

In some embodiments, the vehicle data streaming service access control 520 may further be used to complete a registration of a given data stream source and/or plug-ins. For example, a registration request from a data stream source, such as data stream source 200 of FIG. 2, may require that the vehicle data streaming service access control 520 receive an approval of plug-in registration request to complete the registration of the plug-in as the data stream source. In some embodiments, the approval of the registration may be sent based on a determination that the registration request conforms to a schema for the selected vehicle attribute/synthetic vehicle attribute from the registration request. In some embodiments, the vehicle attributes/synthetic vehicle attributes may include aspects that may be considered to be personally identifiable information ("PII"). PII may include any information that may be linked to or linkable to a certain individual and may furthermore be categorized by "PII levels" or degrees to which the vehicle information may be used to personally identify individuals. In order to protect the privacy of individuals, the vehicle data streaming service may provide higher protections for vehicle data that includes aspects that may be PII. For example, greater access credentials may be required to access or subscribe to vehicle attributes comprising such vehicle data streams. The approval of plug-in registration request may require that the requestor has sufficient authorization to access information regarding the PII—including access to any of the dependent attributes/synthetic attributes of the plug-in. The authorization requirements may include other factors beyond PII authorization, such as the jurisdiction of the requester.

In some embodiments, the approval of the registration may be sent based on a determination that the data stream source to be registered to is an authoritative source for the selected vehicle attribute/synthetic vehicle attribute. In some embodiments, the vehicle data streaming service access control may issue the approval of the registration request and may not require receipt of any approval. In some embodiments, approval may be based both on the proposed data source being an authoritative source for a given attribute and that the data source provides a data stream conforming to a schema of the data streaming service. In some embodiments, the plug-in service 110 may handle request to remove a plug-in for a synthetic vehicle attribute 503.

In some embodiments, the streamed data from the data stream source having schema may be generated by a plug-in. The vehicle data streaming service 100 may send this processed plug-in data as part of a streamed data having a schema conforming to streaming service schema 530. In some embodiments, the plug-in streaming data may be sent to a destination having access to the vehicle data streaming service 100 in accordance with access controls 530 based on the vehicle data streaming service access control 532.

Figure 6:
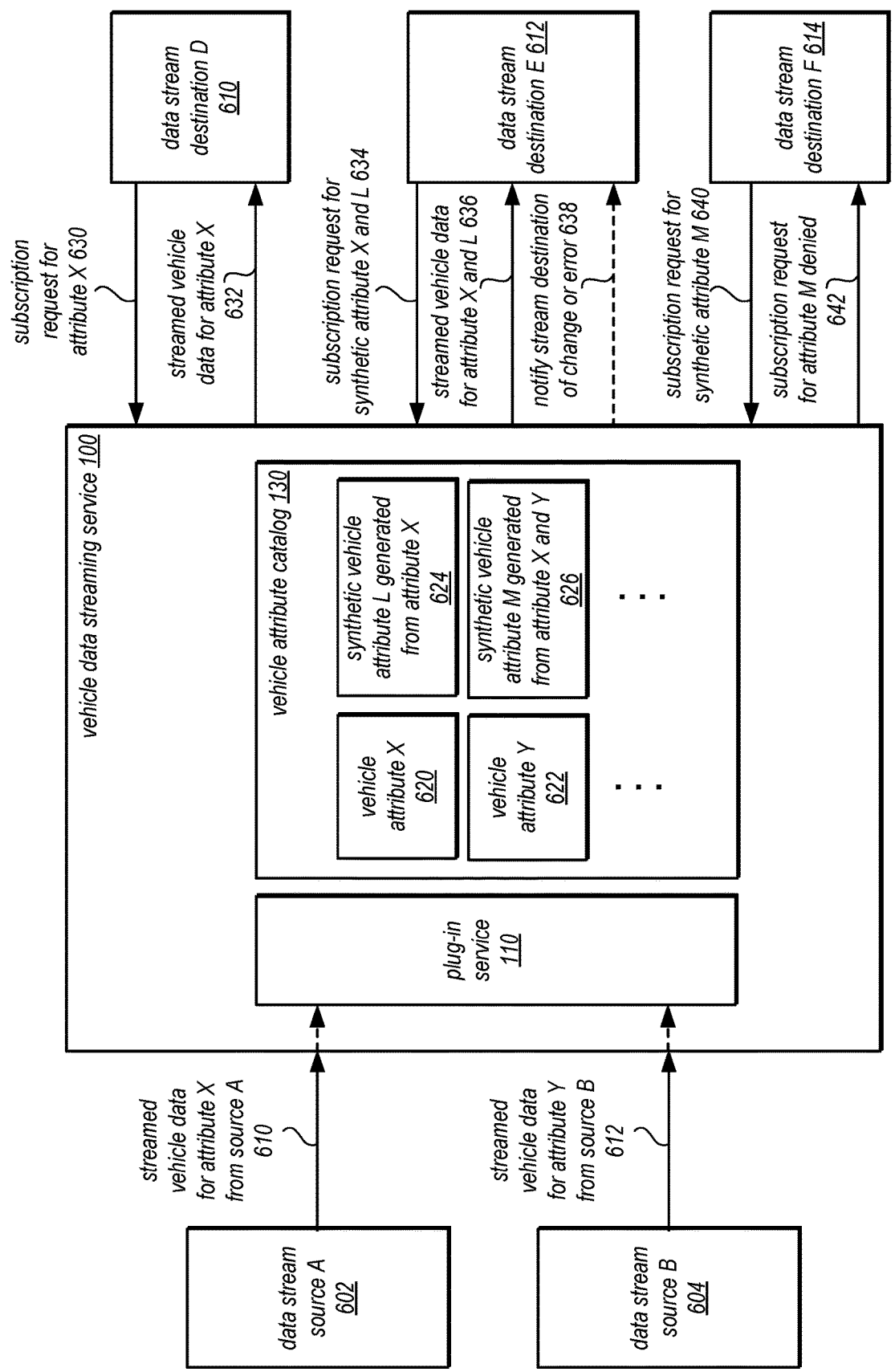
FIG. 6 illustrates a more detailed view of the data streaming service, wherein the data streaming service is configured to receive multiple data streams as inputs to a plug-in, and wherein the plug-in is configured to generate multiple synthetic vehicle attributes. The vehicle data streaming service is also configured to manage subscription requests for vehicle attributes and synthetic vehicle attributes. The vehicle data streaming service is also configured to manage changes and/or errors arising from the plug-in and/or inputs to the plug-in from the vehicle data streaming service, according to some embodiments.

FIG. 6 illustrates a more detailed view of the data streaming service receiving multiple data streams as inputs to a plug-in to generate multiple synthetic vehicle attributes. Furthermore, the vehicle data streaming service handles subscription request for vehicle attributes and synthetic vehicle attributes. The vehicle data streaming service handles changes and/or errors arising from the plug-in and the vehicle data streaming service, according to some embodiments.

In some embodiments, data stream source A 602 and data stream source B 604 may send required registration information to be associated with vehicle attribute X and Y. Upon a successful registration, the data stream source A 602 may send a streamed vehicle data for attribute X from source A 610 to the plug-in service 110. Moreover, upon a successful registration, the data stream source B 604 may send a streamed vehicle data for attribute Y from source B 612 to the plug-in service 110. The vehicle attribute catalog 130 may generate and maintain vehicle attribute X 620 and vehicle attribute Y 622 upon approval of the registration requests for the respective data streams. In some embodiments, the plug-in service 110 may configure a plug-in upon approval of the plug-in request. The plug-in service 110 may receive the streamed data for attribute X from source A 610 and streamed data for attribute Y from source B 612 to generate one or more synthetic vehicle attributes. For example, the plug-in service 110 may generate a synthetic vehicle attribute L generated from attribute X 624 and a synthetic vehicle attribute and generator from attributes X and Y 626.

In some embodiments, various data stream destinations may send subscription requests to be associated with various vehicle attributes/synthetic vehicle attributes. In FIG. 6, data stream destination D 610, data stream destination E 612, and data stream destination F 614 may send subscription requests to the vehicle data streaming service 100 with respective access credentials. In some embodiments, the vehicle data streaming service 100 may approve the subscription requests for attribute X 630 from data stream destination D 610 and based on the approved subscription request, send the streamed vehicle data for attribute X 632. In some embodiments, the vehicle data streaming service 100 may approve the subscription requests for both a synthetic vehicle attribute and a vehicle attribute. For example, the vehicle data streaming service 100 may receive a subscription request for vehicle attribute X and synthetic vehicle attribute L 634 from data stream destination E 612 and based on the approved subscription request, send the streamed vehicle data for synthetic attributes X and L 636. In some embodiments, upon detection of changes in stream destination or error, the vehicle data streaming service 100 may notify the data stream destination E 612. For example, upon disassociation of data stream source A 602 to vehicle attribute X, the data stream destination E 612 may be notified of that dissociation. In some embodiments, the plug-in associated with the synthetic vehicle attribute L may receive an invalid data and generate an error. The vehicle data streaming service 100 may send a notification to the data stream destination E 612 of that error.

In some embodiments, the vehicle data streaming service 100 may reject the subscription request for a synthetic vehicle attribute. For example, the vehicle data streaming service 100 may receive a subscription request for synthetic vehicle attribute M from data stream destination F 614 and based on the rejected subscription request, send a notification of the denied request 642 to the data stream destination F 614. Although FIG. 6 shows only three data stream destinations, any number of data stream destinations may be associated with vehicle attributes/synthetic vehicle attributes. Moreover, the data stream sources may be associated with multiple vehicle attributes and not limited to a connection between one vehicle attribute to one data stream source.

Figure 7:
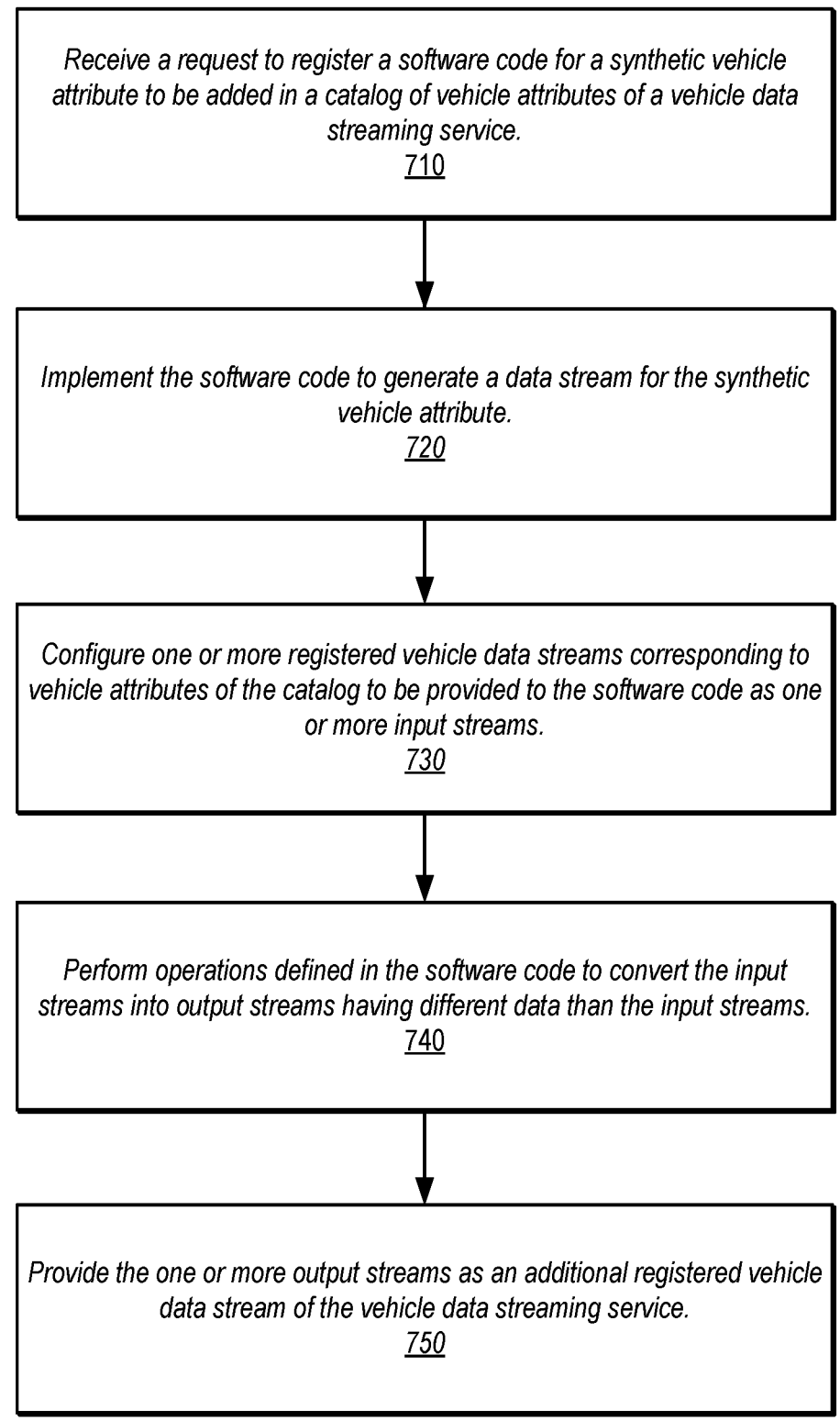
FIG. 7 illustrates a flowchart of operations performed by a vehicle data streaming service to register a plug-in for a synthetic vehicle attribute and to provide a plug-in output stream for the synthetic vehicle attribute, according to some embodiments.

FIG. 7 illustrates a flowchart of operations performed by a vehicle data streaming service to register a software code for a synthetic vehicle attribute and provide a plug-in output stream for the synthetic vehicle attribute, according to some embodiments.

At block 710 a vehicle data streaming service receives a request to register a software code for a synthetic vehicle attribute to be added in a catalog of vehicle attributes of a vehicle data streaming service. As discussed in FIG. 2, in some embodiments, the required registration information may furthermore contain information similar to the subscription request for the synthetic attribute.

At block 720, the vehicle data streaming service implements the software code to generate a data stream for the synthetic vehicle attribute. As discussed in FIG. 3 and FIG. 4, in some embodiments, the plug-ins may be instantiated inside the vehicle data streaming service in a fully automated manner and/or outside of the vehicle data streaming service in a customer configurable compute service environment.

At block 730, the vehicle data streaming service configures one or more registered vehicle data streams corresponding to vehicle attributes of the catalog to be provided to the software code as one or more input streams. As discussed in FIG. 2, various registration interactions may occur through a registration interface of the vehicle data streaming service to register the vehicle data stream to be provided as input streams for the plug-in. In some embodiments, the registration request may have been approved to be registered by the vehicle data streaming service.

At block 740, the vehicle data streaming service performs operations defined in the software code to convert the input streams into output streams having different data than the input streams. In some embodiments, the operations may be restricted based on the available resources in the vehicle data streaming service as discussed in FIG. 4 with respect to a customer configurable plug-in orchestrator.

At block 750, the vehicle data streaming service provides the one or more output streams as an additional registered vehicle data stream of the vehicle data streaming service. As discussed in FIG. 5, in some embodiments, subscription request for the output streams may require a valid access credentials of the requesting entity or valid access credentials provided by the request message to be approved.

Figure 8:
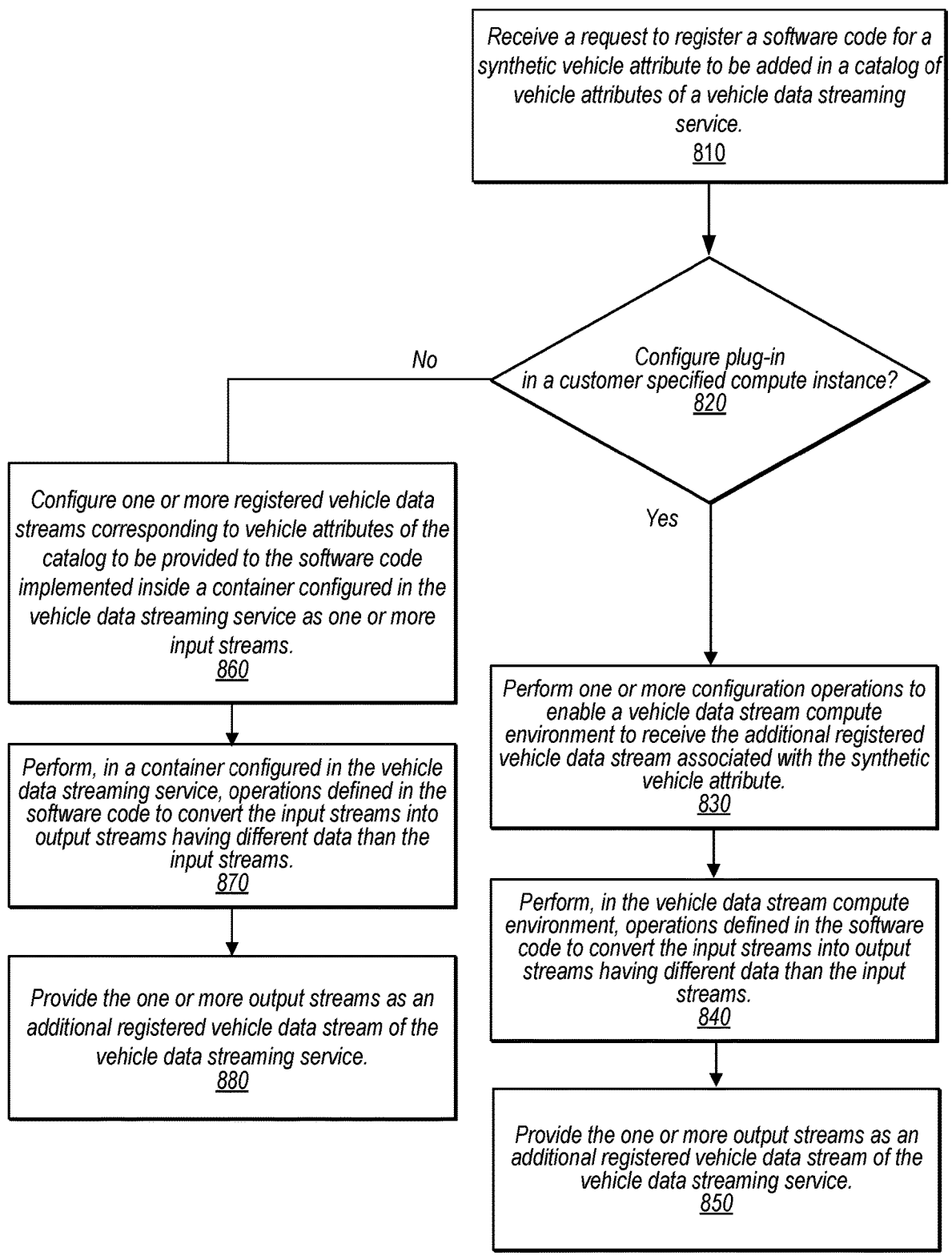
FIG. 8 illustrates a flowchart of operations performed by a vehicle data streaming service to provide a plug-in output stream for a synthetic vehicle attribute using a customer specified compute instance or a plug-in container configured within the streaming service, according to some embodiments.

FIG. 8 illustrates a flowchart of operations performed by a vehicle data streaming service to provide a plug-in output stream for a synthetic vehicle attribute using a customer specified compute instance or a plug-in container configured within the streaming service, according to some embodiments.

At block 810, a vehicle data streaming service receives a request to register a software code for a synthetic vehicle attribute to be added in a catalog of vehicle attributes of a vehicle data streaming service. As discussed in FIG. 2, in some embodiments, the required registration information may furthermore contain information similar to the subscription request for the synthetic attribute.

At block 820, the vehicle data streaming service determines whether the software code configures a plug-in in an external customer configurable compute instance. As discussed in FIG. 3 and FIG. 4, the vehicle data streaming service may determine where to configure the software code based on the plug-in registration request.

At block 830, the vehicle data streaming service performs one or more configuration operations to enable a vehicle data stream compute environment to receive the additional registered vehicle data stream associated with the synthetic vehicle attribute, upon determining that the software code is to be configured in an external customer configurable compute instance. As discussed in FIG. 3, the degree in which the customer may configure the compute instance may be partial or complete. In some embodiments, the compute service may be implemented by another provider network separate from the provider network of the vehicle data streaming service.

At block 840, the vehicle data streaming service performs, in the vehicle data stream compute environment, operations defined in the software code to convert the input streams into output streams having different data than the input streams. For example, as discussed in FIGS. 1, and 4, the vehicle data streaming service may apply one or more operations as instructed in the plug-in to the received input streams to generate a processed data for an associated synthetic vehicle attribute.

At block 850, the vehicle data streaming service provides the one or more output streams as an additional registered vehicle data stream of the vehicle data streaming service. In some embodiments, as discussed in FIG. 6, there may be multiple subscribed vehicle data stream destination receiving the streamed vehicle data based on subscription of multiple destinations.

At block 860, upon determining that the software code is not to be configured in an external customer configurable compute instance, the vehicle data streaming service configures one or more registered vehicle data streams corresponding to vehicle attributes of the catalog to be provided to the software code implemented inside a container configured in the vehicle data streaming service as one or more input streams.

At block 870, the vehicle data streaming service performs, in a container configured in the vehicle data streaming service, operations defined in the software code to convert the input streams into output streams having different data than the input streams. For example, as discussed in FIGS. 1 and 4, the vehicle data streaming service may apply one or more operations as instructed in the plug-in to the received input streams to generate a processed data for an associated synthetic vehicle attribute.

At block 880, the vehicle data streaming service provides the one or more output streams as an additional registered vehicle data stream of the vehicle data streaming service. In some embodiments, as discussed in FIG. 6, there may be multiple subscribed vehicle data stream destination receiving the streamed vehicle data based on subscription of multiple destinations.

Example Computer System

Figure 9:
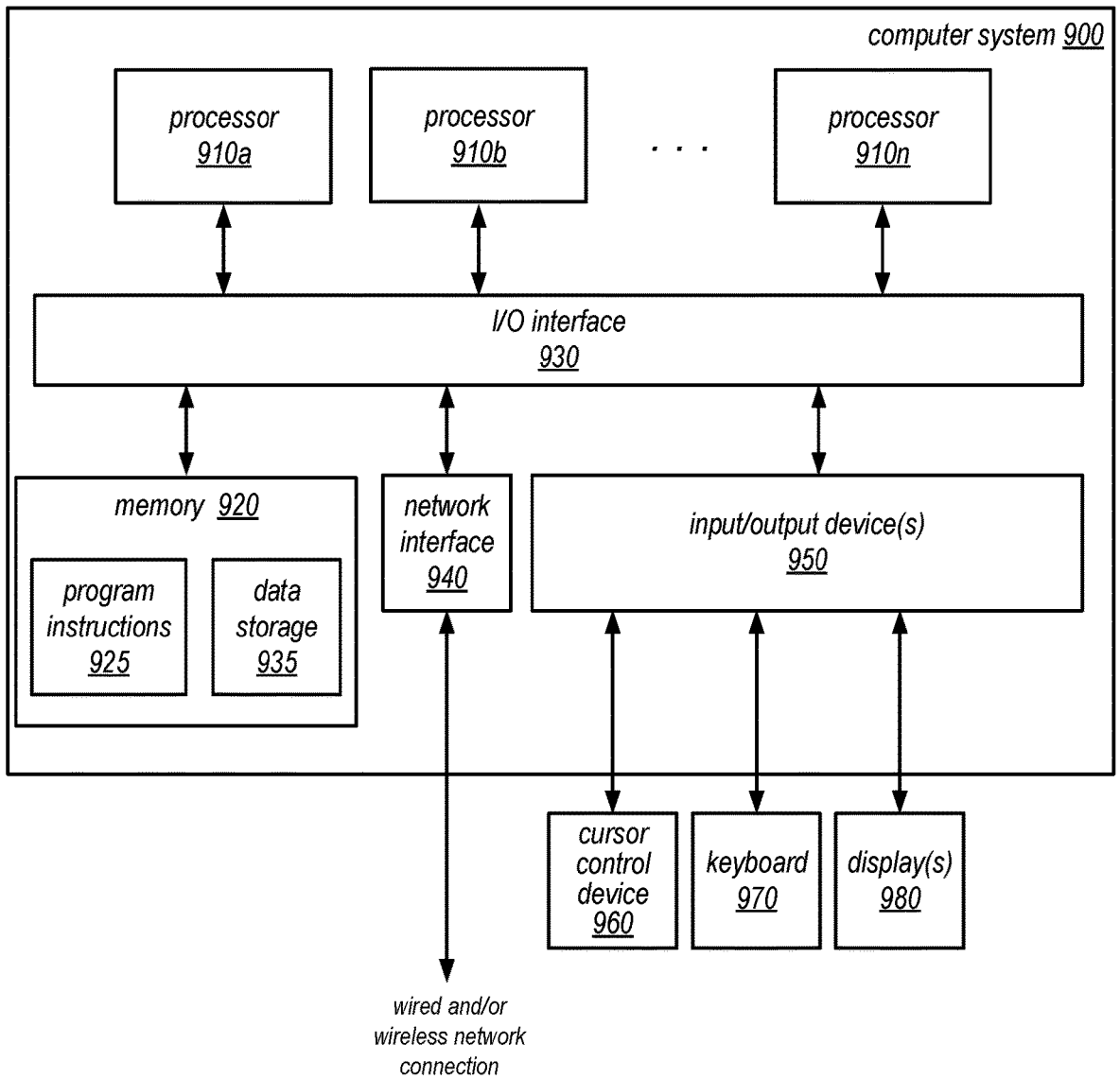
FIG. 9 illustrates a block diagram illustrating an example computer system that implements some or all of the techniques described herein, according to some embodiments.

FIG. 9 illustrates exemplary computer system 900 usable to implement aspects of the vehicle data streaming service as described above with reference to FIGS. 1-8. In different embodiments, computer system 900 may be any of various types of devices.

Various embodiments of program instructions for providing a curated catalog of vehicle attributes, allowing a vehicle plug-in source to register a plug-in to the vehicle data streaming system, and allowing a vehicle data stream destination to subscribe to a synthetic vehicle attribute in the vehicle catalog, as described herein, may be executed in one or more computer systems 900, which may interact with various other devices. Note that any component, action, or functionality described above with respect to FIGS. 1-8 may be implemented on one or more computers configured as computer system 900 of FIG. 9, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such computer systems, or multiple nodes making up computer system 900, may be configured to host different portions or instances program instructions as described above for various embodiments. For example, in one embodiment some elements of the program instructions may be implemented via one or more nodes of computer system 900 that are distinct from those nodes implementing other elements.

In some embodiments, computer system 900 may be implemented as a system on a chip (SoC). For example, in some embodiments, processors 910, memory 920, I/O interface 930 (e.g., a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 920 may be configured to store compression or decompression program instructions 922 and/or sensor data accessible by processor 910. In various embodiments, system memory 920 may be implemented using any suitable memory technology, such as static random-access memory (SRAM), synchronous dynamic RAM (SDRAM), nonvolatile/Flash-type memory, or any other type of memory. In the illustrated embodiment, program instructions 922 may be configured to implement any of the functionality described above. In some embodiments, program instructions and/or data may be received, sent or stored upon different types of computer-accessible media or on similar media separate from system memory 920 or computer system 900.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

Network interface 940 may be configured to allow data to be exchanged between computer system 900 and other devices attached to a network 985 (e.g., carrier or agent devices) or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example, via telecommunications/telephony networks such as analog voice networks or digital fiber communications networks; via storage area networks such as Fiber Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 922, which may be processor-executable to implement any element or action described above. In one embodiment, the program instructions may implement the methods described above. In other embodiments, different elements and data may be included.

Computer system 900 may also be connected to other devices that are not illustrated, or instead may operate as a stand-alone system. In addition, the functionality provided by the illustrated components may, in some embodiments, be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A method, comprising:
   maintaining a catalog of vehicle attributes that have been registered for sharing vehicle data, wherein the catalog comprises:
      entries describing vehicle attributes of registered vehicle data streams generated by respective vehicle sensors; and
      entries describing synthetic vehicle attributes of registered vehicle data streams generated by respective synthetic vehicle sensors;
   receiving a request to register a software code for a given synthetic vehicle attribute to be added in the catalog, wherein the software code comprises program instructions for generating an additional registered vehicle data stream for the given synthetic vehicle attribute using one or more of the vehicle attributes;
   adding to the catalog, based on the request to register the software code, an entry describing the given synthetic vehicle attribute;
   presenting the catalog to customers of the vehicle data streaming service for use in making a subscription selection to subscribe to respective ones of the vehicle attributes and respective ones of the synthetic vehicle attributes, including the given synthetic vehicle attribute, that are available for subscription;
   in response to a subscription selection for the given synthetic vehicle attribute, generating a data stream for the given synthetic vehicle attribute using the software code, wherein generating the data stream using the software code comprises:
      configuring one or more of the registered vehicle data streams corresponding to one or more of the vehicle attributes of the catalog to be provided to the software code as one or more input streams, performing one or more operations defined in the software code to convert the one or more input streams into one or more output streams, wherein the output streams comprise different data than the input streams, and providing the one or more output streams as the additional registered vehicle data stream, corresponding to the given synthetic vehicle attribute.

2. The method of claim 1, further comprising:
receiving the subscription request selecting the given synthetic vehicle attribute from the catalog; and
performing, based on approval of the subscription request, one or more configuration operations to enable a vehicle data stream destination to receive the additional registered vehicle data stream associated with the selected given synthetic vehicle attribute.

3. The method of claim 2, further comprising:
approving the subscription request, wherein the approval of the subscription request comprises:
identifying one or more authorizations associated with the subscription request;
determining whether the one or more authorizations associated with the subscription request are sufficient to access the given synthetic vehicle attribute from the catalog; and
approving the subscription request based on a determination that the one or more authorizations associated with the subscription request are sufficient to access the selected given synthetic vehicle attribute.

4. The method of claim 2, further comprising:
approving the subscription request, wherein the approval of the subscription request comprises:
identifying one or more authorizations of the vehicle data stream destination;
determining whether the one or more authorizations of the vehicle data stream destination are sufficient to access the given synthetic vehicle attribute from the catalog; and
approving the subscription request based on a determination that the one or more authorizations of the vehicle data stream destination are sufficient to access the given synthetic vehicle attribute.

5. The method of claim 1, wherein:
configuring the one or more of the registered vehicle data streams as the one or more input streams comprises performing one or more configuration operations to enable a vehicle data stream compute environment to receive the additional registered vehicle data stream associated with the given synthetic vehicle attribute;
the one or more operations defined in the software code are performed in the vehicle data stream compute environment; and
providing the one or more output streams as the additional registered vehicle data stream of the vehicle data streaming service comprises performing one or more additional configuration operations to enable the vehicle data streaming service to provide the one or more output streams via the vehicle data stream compute environment.

6. The method of claim 1, wherein the software code is implemented using a container allocated to the vehicle data streaming service, and wherein the one or more operations defined in the software code to convert the one or more input streams into the one or more output streams are performed in the container.

7. The method of claim 6, further comprising:
approving the request to register the software code, wherein approval of the request is based, at least in part, on:
a determination that an authorization associated with the request is sufficient to access the one or more of the respective vehicle attributes to be provided to the software code, and
a determination that resources required to execute the software code are less than a resource threshold.

8. The method of claim 1, further comprising:
detecting an addition of, or a removal of, a vehicle data stream associated with the one or more of the vehicle attributes of the catalog to be provided to the software code; and
notifying a vehicle data stream destination configured to receive the additional registered vehicle data stream associated with the given synthetic vehicle attribute of the detected addition of, or the removal of, the vehicle data stream.

9. The method of claim 1, further comprising:
detecting one or more errors in the performing of the one or more operations defined in the software code to convert the one or more input streams into the one or more output streams; and
notifying a vehicle data stream destination configured to receive the additional registered vehicle data stream associated with the given synthetic vehicle attribute of the detected one or more errors.

10. The method of claim 1, further comprising:
preventing implementation of one or more changes to the registered software code for the given synthetic vehicle attribute until a determination that there are no vehicle data stream destinations configured to receive the additional registered vehicle data stream associated with the given synthetic vehicle attribute.

11. The method of claim 1, further comprising:
adding an instance of synthetic vehicle attribute metadata to the catalog or updating an instance of synthetic vehicle attribute metadata in the catalog, wherein the synthetic vehicle attribute metadata provides information about an associated synthetic vehicle attribute, wherein the adding or updating comprises adding or modifying a written description of the given synthetic vehicle attribute or modifying an arrangement of the vehicle attributes and the given synthetic vehicle attribute arranged based on a taxonomy to a different arrangement.

12. A system, comprising:
one or more computing devices configured to implement a vehicle data streaming service, wherein the vehicle data streaming service is configured to:
maintain a catalog of vehicle attributes that have been registered for sharing vehicle data, wherein the catalog comprises:
entries describing vehicle attributes of registered vehicle data streams generated by respective vehicle sensors; and
entries describing synthetic vehicle attributes of registered vehicle data streams generated by respective synthetic vehicle sensors;
receive a request to register a plug-in for a given synthetic vehicle attribute to be added in the catalog, wherein the plug-in comprises program instructions for generating an additional registered vehicle data stream for the given synthetic vehicle attribute using one or more of the vehicle attributes;

add to the catalog, based on the request to register the plug-in, an entry describing the given synthetic vehicle attribute;

present the catalog to customers of the vehicle data streaming service for use in making a subscription selection to subscribe to respective ones of the vehicle attributes and respective ones of the synthetic vehicle attributes, including the given synthetic vehicle attribute, that are available for subscription;

in response to a subscription selection for the given synthetic vehicle attribute, generate a data stream for the given synthetic vehicle attribute using the plugin, wherein to generate the data stream for the plug-in, the vehicle data streaming service is configured to:

perform one or more configuration operations to enable one or more of the registered vehicle data streams corresponding to one or more of the vehicle attributes of the catalog to be provided to the plug-in as one or more input streams, perform one or more operations defined in the program instructions of the plug-in to convert the one or more input streams into one or more output streams, wherein the output streams comprise different data than the input streams, and perform one or more configuration operations to enable the one or more output streams to be provided as the additional registered vehicle data stream, corresponding to the given synthetic vehicle attribute.

13. The system of claim 12, wherein the vehicle data streaming service is further configured to:

receive the subscription request selecting the given synthetic vehicle attribute from the catalog; and perform, based on approval of the subscription request, one or more configuration operations to enable a vehicle data stream destination to receive the additional registered vehicle data stream associated with the selected given synthetic vehicle attribute.

14. The system of claim 12, further comprising a provider network, wherein the provider network is configured to provide a plurality of services to clients of the provider network, wherein at least one of the services is the vehicle data streaming service.

15. The system of claim 14, wherein:

at least another one of the plurality of services provided by the provider network is a compute service configured to execute the program instructions of the plug-in to implement the plug-in on a compute instance of the computing service, to implement the plug-in, the vehicle data streaming service is further configured to:

configure the one or more of the registered vehicle data streams corresponding to the one or more of the vehicle attributes of the catalog, such that the one or more of the registered vehicle data streams are configured to be provided to the compute instance that implements the plug-in as one or more input streams to perform the one or more operations defined in the plug-in; and wherein the vehicle data streaming service provides the one or more output streams as the additional registered vehicle data stream via the compute instance of the computing service.

16. The system of claim 12, wherein the plug-in is implemented using a container allocated to the vehicle data streaming service, and wherein the one or more operations defined in the plug-in to convert the one or more input streams into the one or more output streams are performed in the container.

17. One or more non-transitory, computer-readable storage media, storing program instructions that when executed on or across one or more processors cause the one or more processors to implement a vehicle data streaming service that implements:

maintaining a catalog of vehicle attributes that have been registered for sharing vehicle data, wherein the catalog comprises:

entries describing vehicle attributes of registered vehicle data streams generated by respective vehicle sensors; and entries describing synthetic vehicle attributes of registered vehicle data streams generated by respective synthetic vehicle sensors;

receiving a request to register a software code for a given synthetic vehicle attribute to be added in the catalog, wherein the software code comprises program instructions for generating an additional registered vehicle data stream for the given synthetic vehicle attribute using one or more of the vehicle attributes;

adding to the catalog, based on the request to register the software code, an entry describing the given synthetic vehicle attribute;

presenting the catalog to customers of the vehicle data streaming service for use in making a subscription selection to subscribe to respective ones of the vehicle attributes and respective ones of the synthetic vehicle attributes, including the given synthetic vehicle attribute, that are available for subscription;

in response to a subscription selection for the given synthetic vehicle attribute, generating a data stream for the given synthetic vehicle attribute using the software code, wherein generating the data stream using the software code comprises:

configuring one or more of the registered vehicle data streams corresponding to one or more of the vehicle attributes of the catalog to be provided to the software code as one or more input streams, performing one or more operations defined in the software code to convert the one or more input streams into one or more output streams, wherein the output streams comprise different data than the input streams, and providing the one or more output streams as the additional registered vehicle data stream, corresponding to the given synthetic vehicle attribute.

18. The one or more non-transitory, computer-readable storage media of claim 17, wherein the vehicle data streaming service further implements:

receiving the subscription request selecting the given synthetic vehicle attribute from the catalog; and performing, based on approval of the subscription request, one or more configuration operations to enable a vehicle data stream destination to receive the additional registered vehicle data stream associated with the selected given synthetic vehicle attribute.

19. The one or more non-transitory, computer-readable storage media of claim 17, wherein the vehicle data streaming service further implements:

detecting an addition of, or a removal of, a vehicle data stream associated with the one or more of the vehicle attributes of the catalog to be provided to the software code; and notifying a vehicle data stream destination configured to receive the additional registered vehicle data stream associated with the given synthetic vehicle attribute of the detected addition of, or the removal of, the vehicle data stream.

20. The one or more non-transitory, computer-readable storage media of claim 17, wherein the vehicle data streaming service further implements:

preventing implementation of one or more changes to the registered software code for the given synthetic vehicle attribute until a determination that there are no vehicle data stream destinations configured to receive the additional registered vehicle data stream associated with the given synthetic vehicle attribute.

* * * * *